United States Patent [19]

Huerre et al.

[11] Patent Number: 5,067,022
[45] Date of Patent: Nov. 19, 1991

[54] TELEVISION SET FASCIA

[75] Inventors: Dominique Huerre, Angers; Jacques Mehu, Saint Barthelemy D'Anjou, both of France

[73] Assignee: Societe Electronique de la Region Pays de Loire, Courbevoie, France

[21] Appl. No.: 487,958
[22] PCT Filed: Oct. 6, 1989
[86] PCT No.: PCTFR/89/00515
§ 371 Date: May 14, 1990
§ 102(e) Date: May 14, 1990
[87] PCT Pub. No.: WO90/04902
PCT Pub. Date: May 3, 1990

[30] Foreign Application Priority Data

Oct. 19, 1988 [FR] France .................. 88 13761

[51] Int. Cl.⁵ .................................. H04N 5/645
[52] U.S. Cl. .................. 358/248; 358/245; 358/254

[58] Field of Search ............... 358/245, 247, 248, 249, 358/254; 220/2.1 A, 2.3 A

[56] References Cited

U.S. PATENT DOCUMENTS 4,360,838 11/1982 Babicz et al. .................. 358/248
4,853,790 8/1989 Dickie .......................... 358/254

FOREIGN PATENT DOCUMENTS 0232917 8/1987 European Pat. Off. .
3315448 10/1984 Fed. Rep. of Germany .

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

Television set fascia comprises mechanism for centering the tube which are arranged at the four corners of the screen. These mechanisms aer composed essentially of two symmetrical elastic tabs. The retention of the tube is ensured by retaining ribs.

5 Claims, 1 Drawing Sheet

U.S. Patent     Nov. 19, 1991     5,067,022
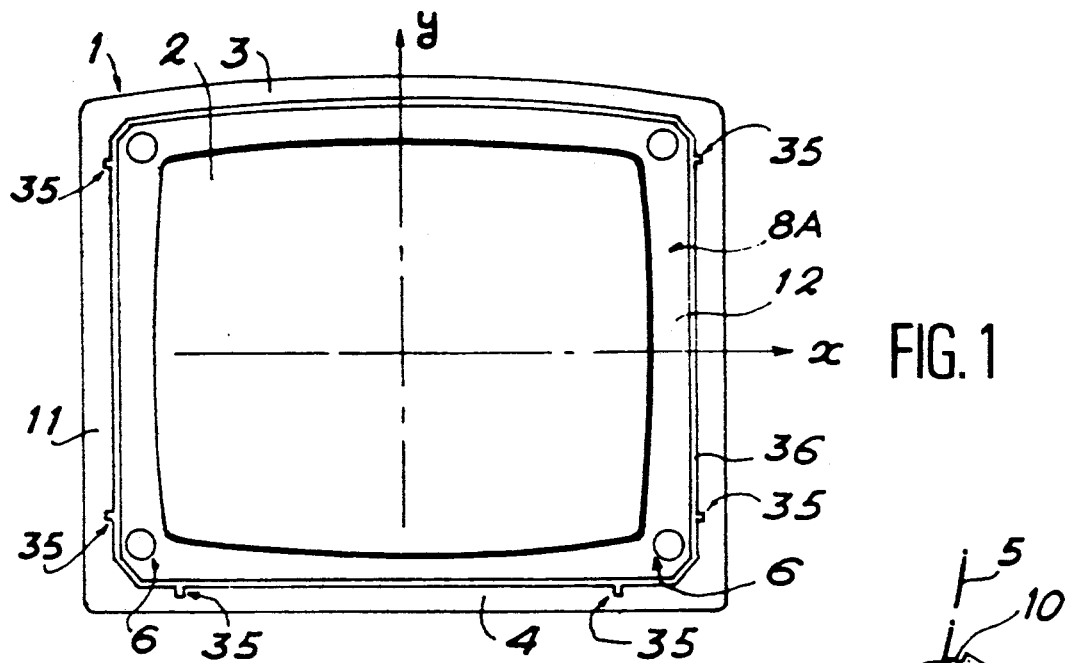
FIG. 1
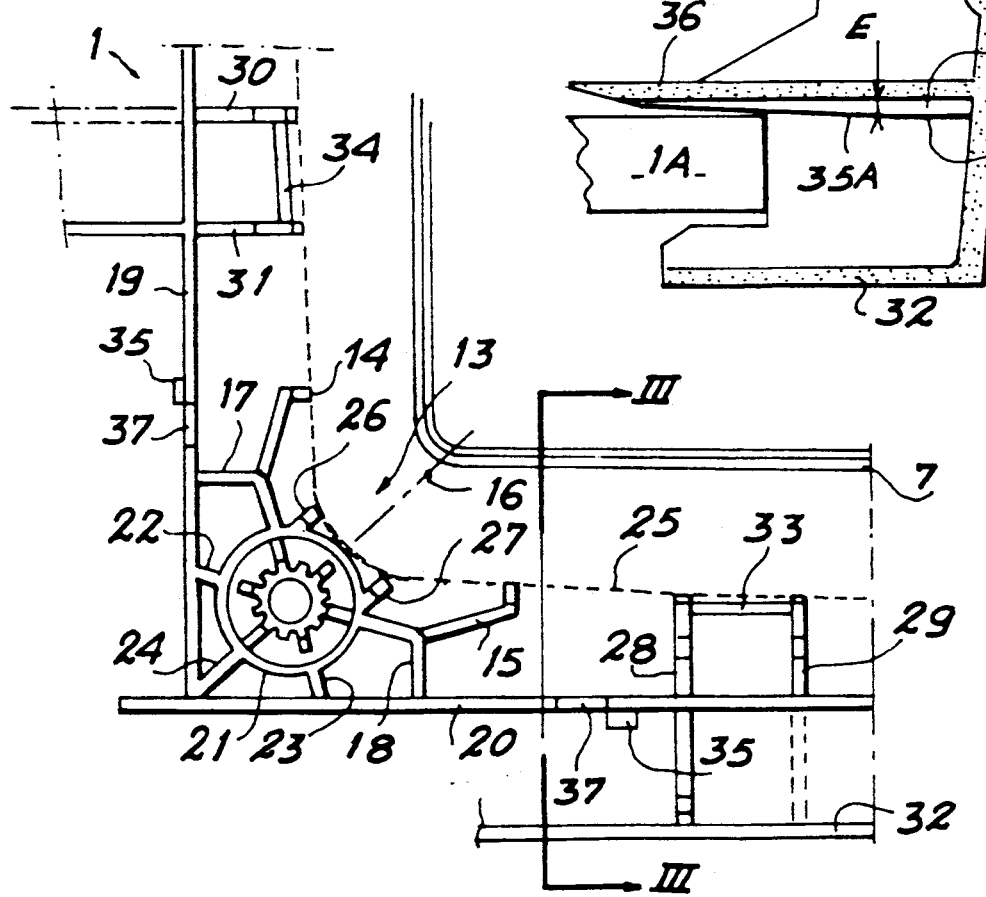
FIG. 2
FIG. 3

TELEVISION SET FASCIA

BACKGROUND OF THE INVENTION

1. Field of the Invention

The present invention to a television set fascia.

2. Description of the Related Art

The fascias of television sets, especially of those equipped with so-called "flat-screen" cathode-ray tubes, usually have aesthetic defects. The inner rim of the fascias is not laid uniformly against the screen: this rim theoretically has the same curvature as the screen, but because of the production tolerances and the approximate centering of the tube in relation to the fascia when the tube is mounted the rim of the fascia is not laid uniformly against the screen.

Moreover, the vibrations experienced by the sets during their transfer and functioning cause abrasion of the rim of the fascia in contact with the screen. The dust generated by this abrasion remains on the screen.

Finally, the known fascias do not effectively support the cathode-ray tubes which may be destroyed if the sets fall a little way.

SUMMARY OF THE INVENTION

The subject of the present invention is a television set fascia which can be laid as closely as possible against the screen of the cathode-ray tube over the entire length of its rim, without generating troublesome visible dust, and which makes it possible to automatically center the cathode-ray tube exactly during the mounting operation, whilst at the same time supporting it effectively and protecting it from shocks.

The fascia according to the invention has an inner rim of which the surface of contact with the screen of the cathode-ray tube is more plane than the surface of the screen. During the mounting of the cathode-ray tube, the fascia is laid against the screen first in the middle of its length and then progressively towards its edges. Advantageously, the inner profile of the fascia comprises a rim of which the visible end has a step.

According to another advantageous characteristic of the invention, the fascia comprises, in each corner of its inner face, two elastic tabs for centering the cathode-ray tube which are arranged symmetrically in relation to the bisector of this corner, these tabs being laid against the surround of the cathode-ray tube.

According to yet another characteristic of the invention, the fascia has, on its inner rim, a plurality of retaining ribs arranged substantially perpendicularly relative to the periphery of the inner cutout of the fascia and extending substantially as far as this rim, these ribs being integral with the peripheral partition of the fascia. Advantageously, these ribs are produced in pairs of ribs parallel to one another and connected near their ends located on the same side as the rim by means of a rib.

BRIEF DESCRIPTION OF THE DRAWINGS

The present invention will be understood better from a reading of the detailed description of an embodiment taken as a non-limiting example and illustrated in the accompanying drawing in which:

FIG. 1 is a rear plan view of a television set fascia according to the invention, FIG. 2 is a partial rear view of a corner of the fascia of FIG. 1, and FIG. 3 is a section view according to III—III of FIG. 2.

DESCRIPTION OF THE PREFERRED EMBODIMENT

The television set fascia 1 illustrated in FIG. 1 is intended more particularly for sets where the cathode-ray tube has an almost flat screen, but it goes without saying that the invention likewise applies to cathode-ray tubes with a more curved screen. The fascia 1 can have either a rectangular contour or a contour with curved sides. This fascia can be symmetrical or asymmetric in relation to the axes Ox and Oy of the screen 2. For the effective implementation of the invention, it is preferable if the horizontal sides 3, 4 of the fascia 1 do not have too high a bending rigidity, thus allowing it to mate more closely with the surface 5 of the screen 2 against which it is laid.

The following procedure is adopted for installing the fascia 1 on a cathode-ray tube comprising a fasciafastening device, for example of the screw type fastened at the four corners of the screen to lugs fixed to the anti-implosion surround of the tube (the female parts of this screwing device, in the present case of the type known per se with a self-tapping screw, are locked in locations 6 of suitable shape which are formed on the inner face of the fascia 1).

The fascia has a surface 7 which has to be brought into the most intimate possible contact with the screen 2. This surface 7 is formed by the cant of the rim 8 of the cutout of the fascia 1. The rim 8 is directed towards the inside of the set and has virtually the same thickness of, for example, approximately 2 to 5 mm as the other walls of the fascia 1, especially the main wall 8A of this fascia. The end 9 of the rim 8 has a thickness reduced on one side, for example by half. This reduction in thickness is carried out on the outer face 10 of the rim 8. Thus, the annular surface 7 has a small width, thereby ensuring that its friction against the screen 2 generates less debris than without the thickness reduction. On the other hand, the powdery debris generated by this friction remains mostly in the step formed by the thickness reduction and is therefore invisible to the user. According to the invention, the surface 7 has a radius of curvature larger than that of the screen 2.

During the assembly of the cathode-ray tube and the fascia 1, the following procedure is adopted in order to ensure the most intimate possible contact between the surface 7 and the screen 2. First the middles of the horizontal sides 3, 4 of the fascia 1 are laid against the screen of the immobilized tube, then, still maintaining pressure on these middles, the other parts of the sides 3, 4 are laid down under pressure, going away from their middles symmetrically, and then the vertical sides 11, 12 of the fascia, and finally the screwing device of the tube is screwed, pressure at the same time being maintained over the entire fascia. Thus, as a result of its higher radius of curvature the surface 7 is laid in its entirety against the screen 2.

The self-centering of the tube in relation to the fascia 1, that is to say the correct positioning of the effective surface of the screen 2 in relation to the aperture (or "window") of the fascia, is obtained by means of four centering devices 13, each formed in the region of a location 6. Each device 13 comprises at least two elastic tabs 14, 15 arranged symmetrically relative to the bisector 16 of the corresponding angle of the fascia. These tabs 14, 15 all take the same form of tongues, plane over most of their length. This plane part forms an angle of approximately 30 to 45° relative to the bisector 16. The ends of these tabs are bent and are respectively parallel to the axes Ox and Oy of the screen 2. These tabs 14, 15 are perpendicular relative to the main surface of the fascia 1. These tabs 14, 15 are formed as protuberances on stationary rigid ribs 17, 18 respectively. In the embodiment illustrated in the drawing, the ribs 17, 18 are connected at one of their ends to straight rigid ribs 19, 20 respectively which are respectively parallel to the axes Oy, Ox of the screen 2 and at their other end to a short cylinder 21, the axis of which is located on the bisector 16, the cylinder 21 being arranged very near the corner of the ribs 19, 20 and being connected to these by means of three other short ribs 22, 23, 24, the rib 24 being arranged on the bisector 16 and meeting the corner of the ribs 19, 20, and the ribs 22, 23 being symmetrical relative to the rib 24 and near this. The ribs 17, 18 are further away from the rib 24 than are the ribs 22, 23. All the above-mentioned ribs are perpendicular relative to the main plane of the fascia 1 and are connected to the inner face of the fascia. The four cylinders 21, the axes of which are perpendicular relative to the main surface of the fascia 1 (which is parallel to the drawing plane of FIGS. 1 and 2) and arranged at the abovementioned locations 6 serve as locations for the screwing devices of the cathode-ray tube (which are not shown). The surround ("mould match line") 25 of the cathode-ray tube bears on the cants of the ends of the tabs 14, 15. Advantageously, the centering device 13 can be completed with short tabs 26, 27 formed on the cylinder 21 in parallel with the bisector 16, equidistant and near the latter.

The length of these tabs 14, 15, 26, 27 is such that their ends reach the theoretical level of the surround 25. Thus, when the fascia 1 is offered to the cathode-ray tube, the latter positions itself correctly between the devices 13, that is to say its diagonals coincide with the corresponding bisectors 16.

So that the fascia 1 can retain and protect the cathode-ray tube in the event of shocks on the television set and even falls of this set over a small height, retaining ribs are formed on the rear face of this fascia. These ribs are perpendicular relative to the main surface of the fascia and are substantially perpendicular relative to the direction of the surround 25, and they extend as far as the most advanced level of this surround, so as to allow for all the production tolerances. Advantageously, these ribs are formed by pairs of parallel ribs, such as the pairs of ribs 28, 29 and 30, 31. These ribs "bear" on other ribs or rims which are present on the fascia 1 and which are substantially perpendicular to them.

Thus, for example, the ribs 28, 29 bear on the rib 20 and the outer surround 32 of the fascia, to which they are perpendicular. The ribs 30, 31 bear on the rib 19 and on other ribs or rims not shown in the drawing.

Furthermore, the ribs of each pair are connected to one another by means of a transverse rib 33, 34 near their end facing the surround 25.

Of course, all the pairs of retaining ribs are formed integrally with the ribs or rims on which they bear. Thus, the possible thrusts which the cathode-ray tube can exert on the retaining ribs are absorbed by these other ribs or rims on which they bear.

To ensure a self-centering of the fascia 1 during its mounting on the cabinet 1A of the television set, the fascia is equipped with small ribs 35 formed integrally with the fastening skirt (designated as a whole by 36) of this fascia.

Conventionally, the fastening skirt takes the form of a thin and very wide rib (for example, of a width of approximately 3 to 5 cm) formed on the inner face of the fascia in parallel with the outer peripheral surround 32 of this fascia (that is to say, perpendicularly relative to the main plane of the fascia). The skirt 36 thus forms a substantially rectangular frame. The above-mentioned ribs 19 and 20 form part of the skirt 36.

To ensure that the skirt 36 has some bending flexibility, notches 37 are made at a plurality of points along its length. In an illustrative embodiment, these notches 37 are arranged at the ends of each side of the skirt 36 in the vicinity of the locations 6. The depth of these notches is slightly smaller than the width of the skirt. The width of these notches 37 is approximately 3 to 10 mm, and they are made perpendicularly relative to the main plane of the fascia. The ribs 35 are formed on the outer face of the skirt along one of the sides of each notch (with the exception of the notches on the upper horizontal side of the skirt 36). The transverse width of the ribs 35 (measured in parallel with the corresponding side of the fascia) is approximately 2 to 3 mm.

The thickness E (measured perpendicularly relative to the corresponding side of the fascia) of the ribs 35 is virtually zero at the edge of the skirt and increases uniformly over a large part of their length, is then constant at its maximum value over the last part of its length (for example, over the last 5 millimetres), as far as the base of the skirt (that is to say, the junction of the skirt and the main wall 8A of the fascia 1). The maximum value of the thickness E is approximately 2 to 4 mm.

For aesthetic reasons, it is preferable if the upper face of the peripheral surround 32 of the fascia comes level with the outer face of the upper wall of the cabinet of the television set (to mask the front cant of this wall), whereas, if the cant of the lower wall is slightly exposed (lower part of the surround 32 higher than the outer face of the horizontal wall of the cabinet), it is not generally visible. Consequently, no ribs 35 are formed on the upper horizontal part of the skirt 36. Of course, the ribs 35 of the skirt 36 are not necessarily formed in the immediate vicinity of the notches 37 or in the vicinity of the location 6, and they can be of a different number.

Let 38 be the regions of the cants 35A of the ribs 35 where the thickness E is at its maximum (that is to say near the base of the skirt 36). This thickness E is such that the nominal distance between the regions 38 of two corresponding ribs of the opposite sides 11, 12 is virtually equal to the maximum acceptable distance between the vertical walls of the cabinet. Similarly, the distance between the regions 38 of the ribs of the lower horizontal part of the skirt 36 and the outer face of the upper part of the skirt 36 is virtually equal to the maximum acceptable distance between the horizontal walls of the cabinet.

Thus, when the fascia 1 is installed on the cabinet 1A by introducing the skirt 36 into this cabinet, the skirt easily penetrates into the cabinet, of course on the understanding that the robot for installing the fascia offers the fascia correctly in front of the cabinet. At a particular moment during the penetration of the skirt into the cabinet which is a function of the actual dimensions of the fascia and of the cabinet (allowing for the dimensional production tolerances), the cants 35A of the ribs 35 bear on the inner faces of the cabinet, forcing the fascia to center itself relative to the cabinet in the horizontal direction and, if appropriate, stressing it upwards. In the event that the distance between the walls of the cabinet is at its maximum, only the zones of the regions 38 of the ribs 35 are in contact with the walls of the cabinet and the skirt is not bent at all. Otherwise, the skirt begins to bend shortly after its introduction into the cabinet

We claim:

1. A television set fascia comprising:
   an inner rim having a surface which faces and contacts a screen of a cathode-ray tube of said television set, said surface of said inner rim defining a step-portion of reduced thickness with respect to said inner rim for reducing debris caused by friction between said surface and said screen and catching the debris from said friction in said step portion; and
   two elastic tabs for centering the cathode-ray tube located on each corner of an inner face of said fascia, said two elastic tabs being symmetrically arranged with respect to a bisector on each of said corners.

2. Fascia according to claim 1, wherein said surface of said inner rim has a larger radius of curvature than said screen for permitting the surface to be entirely laid against the screen.

3. Fascia according to claim 1, further comprising:
   a plurality of retaining ribs arranged on an inner periphery of said fascia and substantially perpendicular to the inner rim of the fascia, said retaining ribs substantially extending to said inner rim and being integrally formed with further ribs or partitions of the inner face of the fascia which are substantially perpendicular relative to the retaining ribs.

4. Fascia according to claim 3, wherein said retaining ribs comprise pairs of ribs which are parallel to one another and connected at their ends which face the tube by means of a connector rib.

5. Fascia according to claim 4, further comprising a fastening skirt having an outer face, said fastening skirt comprising ribs of increasing thickness on the outer face of said fastening skirt for ensuring the centering of the fascia.

* * * * *